Jan. 28, 1941.  T. WEBER, JR  2,229,947
INTEGRATING APPARATUS
Filed June 7, 1940
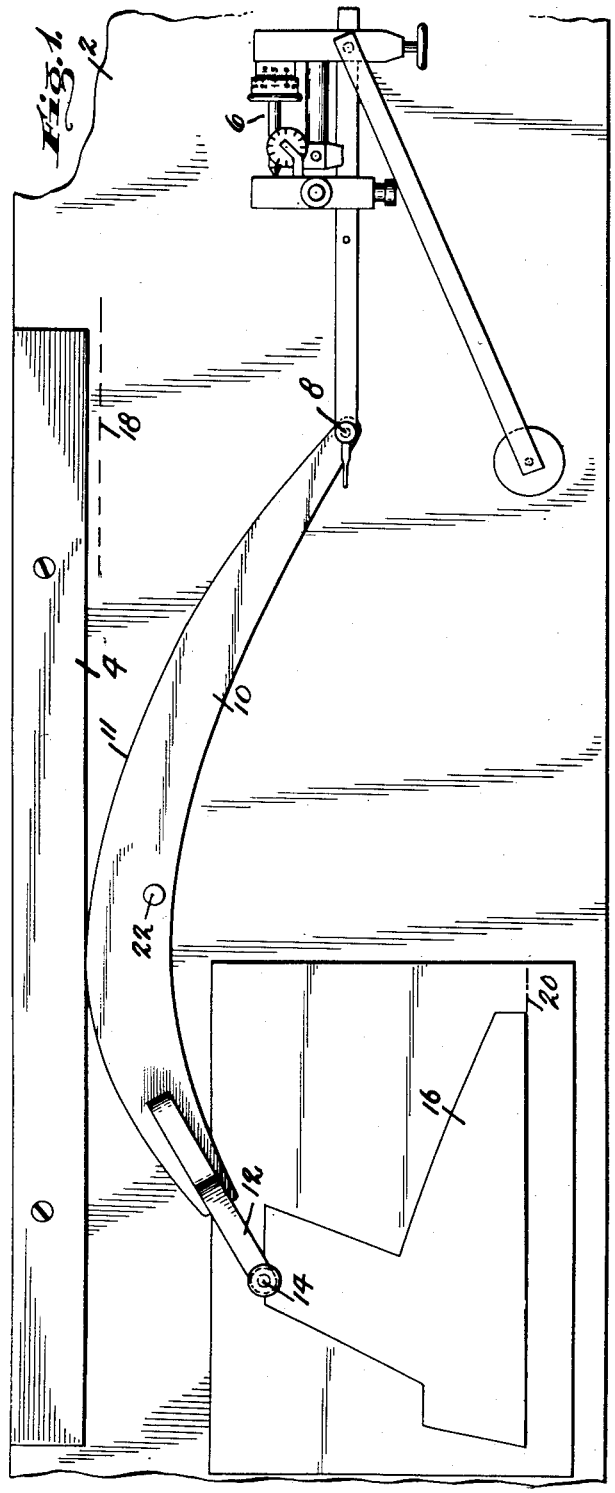
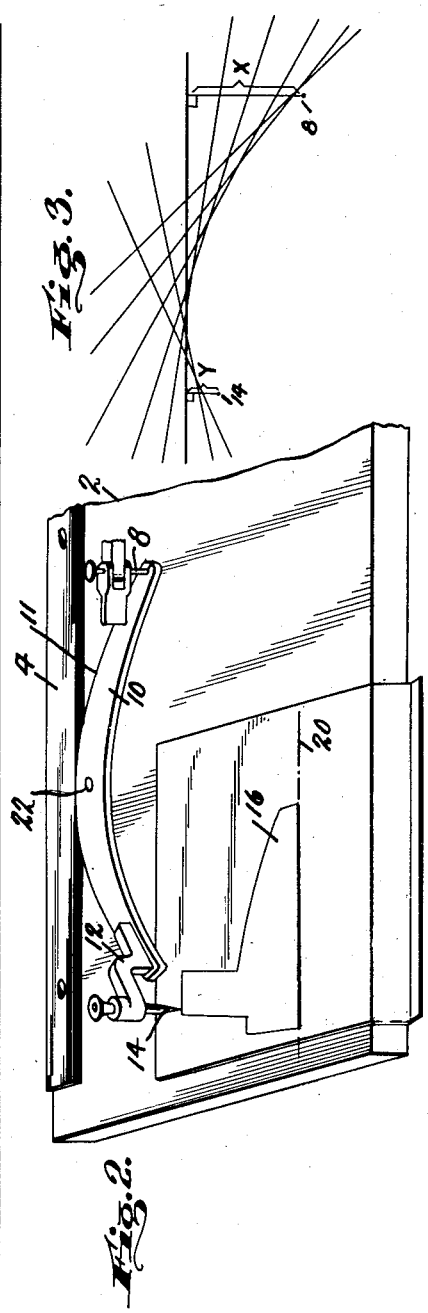
INVENTOR
THEODORE WEBER, JR.
BY
Kiddle, Bithell and Montgomery
ATTORNEY Patented Jan. 28, 1941

2,229,947

UNITED STATES PATENT OFFICE 2,229,947

INTEGRATING APPARATUS

Theodore Weber, Jr., Cliffside Park, N. J.

Application June 7, 1940, Serial No. 339,211

1 Claim. (Cl. 235—61)

My invention is directed to an improvement in integrating apparatus, and has for one of its objects the provision of a construction to be employed in conjunction with a planimeter to determine the required moment of a given plane figure.

More specifically my invention comprises a template the edge of which has a predetermined curve which is dependent upon the moment desired. This curved edge must be kept in contact with a straight edge which is parallel to the axis of the plane figure under consideration. At one end the template is provided with a pointer or any equivalent means adapted to traverse the periphery of a plane figure a predetermined moment of which is to be found. The other end of the curve is pivotally attached to the tracing pointer of a planimeter. The axis of the figure is not only parallel to the straight edge but is at a predetermined distance therefrom. When the figure is traversed the planimeter is read in the usual manner, but the reading, instead of being the area of the figure, will be the desired moment of the figure with respect to the axis.

The curve of the template is so cut or shaped that so long as the curve is in contact with the straight edge, the distance of the pivotal connection of the template with the tracer pointer of the planimeter from a fixed reference line, which is parallel to the straight edge, will be the $(n+1)$ power of the distance of the tracer of the template from the axis of the figure, divided by $(n+1)$ if the moment to be found is the $n$th. For example, in the case of the first moment the last mentioned distance would be half the square of the aforementioned distance.

In the accompanying drawing:

Fig. 1 shows an embodiment of my invention in plan;

Fig. 2 is a perspective view; and

Fig. 3 is a diagrammatic view explanatory of the curve of the template.

Referring to the drawing in detail: 2 designates the base-board upon which my apparatus may be set up. 4 designates a fixed straight edge which for convenience may be anchored to the board 2.

6 designates a planimeter of usual construction and equipped as is usual with tracer pointer 8.

10 designates a template having a smooth curved edge 11 which has a sliding rolling engagement with the straight edge when the equipment is in use. One end of this template is pivotally connected to the tracer pointer 8 of the planimeter. For example, the template might be provided with a small hole which receives the planimeter tracer pointer. The opposite end of the template 10 is equipped with an arm 12 carrying a tracer 14. This tracer may be a pointer as shown, or a transparent insert with crossed lines, or any other suitable form of tracer.

16 designates a plane figure in place on the board 2. It is desired to find the first moment of this figure.

Under these conditions the smooth curved edge 11 of the template 10 is so formed that in all positions of the template, of course within the limits for which it is designed, and with the curved edge 11 in contact with the straight edge 4, the distance of the pivotal connection of the template with the tracer pointer 8 of the planimeter from a fixed reference line 18 will be half the square of the distance of pointer 14 from the axis 20 of the plane figure 16. The axis of the plane figure it will be understood is parallel with the straight edge 4 and at a definite distance therefrom.

The entire periphery of the figure 16 is traversed by the tracer 14, the template 10 being maintained in contact with the straight edge 4 by slight pressure on the knob 22 with which the template is equipped. After the figure 16 has been traversed the planimeter reading will give the moment desired.

It is to be understood that with a given curve one moment of any plane figure can be integrated, but that by the same token a different curve is required for each moment.

To show how the curve of the edge 11 of the template is arrived at reference will be had to Fig. 3. Assuming the moment desired is $n$, the distance between the axis 20 of the plane figure and the straight edge 4 is $a$, and the distance from the fixed reference line 18 to the straight edg 4 is $b$, then the values of X for a large number of values of Y are tabulated in the following equation $$X = \frac{(a-Y)^{n+1}}{n+1} + b$$

Then draw a series of straight lines as shown in Fig. 3 with tabulated values of X and Y, the values of X and Y being measured perpendicularly to the line being laid out in a convenient unit. The lines, if sufficient in number, will form a smooth curve, which will be the convex surface 11 of the template 10.

It is to be understood that changes may be made in the details of construction and arrangement of parts without departing from the spirit and scope of my invention.

What I claim is:

An apparatus for adapting a planimeter so that it will measure moments of plane figures comprising in combination a straight edge, a template, means for pivotally attaching a fixed point on the template to the tracer point of a planimeter, a tracer point for the template, one edge of the template being curved for continuous engagement with the straight edge throughout the entire movement of the template tracer point in traversing the periphery of the plane figure, the contour of said curved edge consisting of the envelope of an infinite number of straight lines, each of which satisfies the condition that perpendiculars X and Y dropped to the line from (1) the point of attachment of the template to the planimeter, and (2) the tracer point of the planimeter shall have lengths which satisfy the formula $$X = \frac{(a-Y)^{n+1}}{n+1} + b$$

wherein $n$ represents the moment to be measured, $a$ the distance between the axis of the figure being integrated and the said straight edge, said axis being fixed and parallel to the straight edge, and $b$ the distance between the straight edge and an arbitrarily positioned reference line extending parallel to the straight edge.

THEODORE WEBER, Jr.